UNITED STATES PATENT OFFICE.

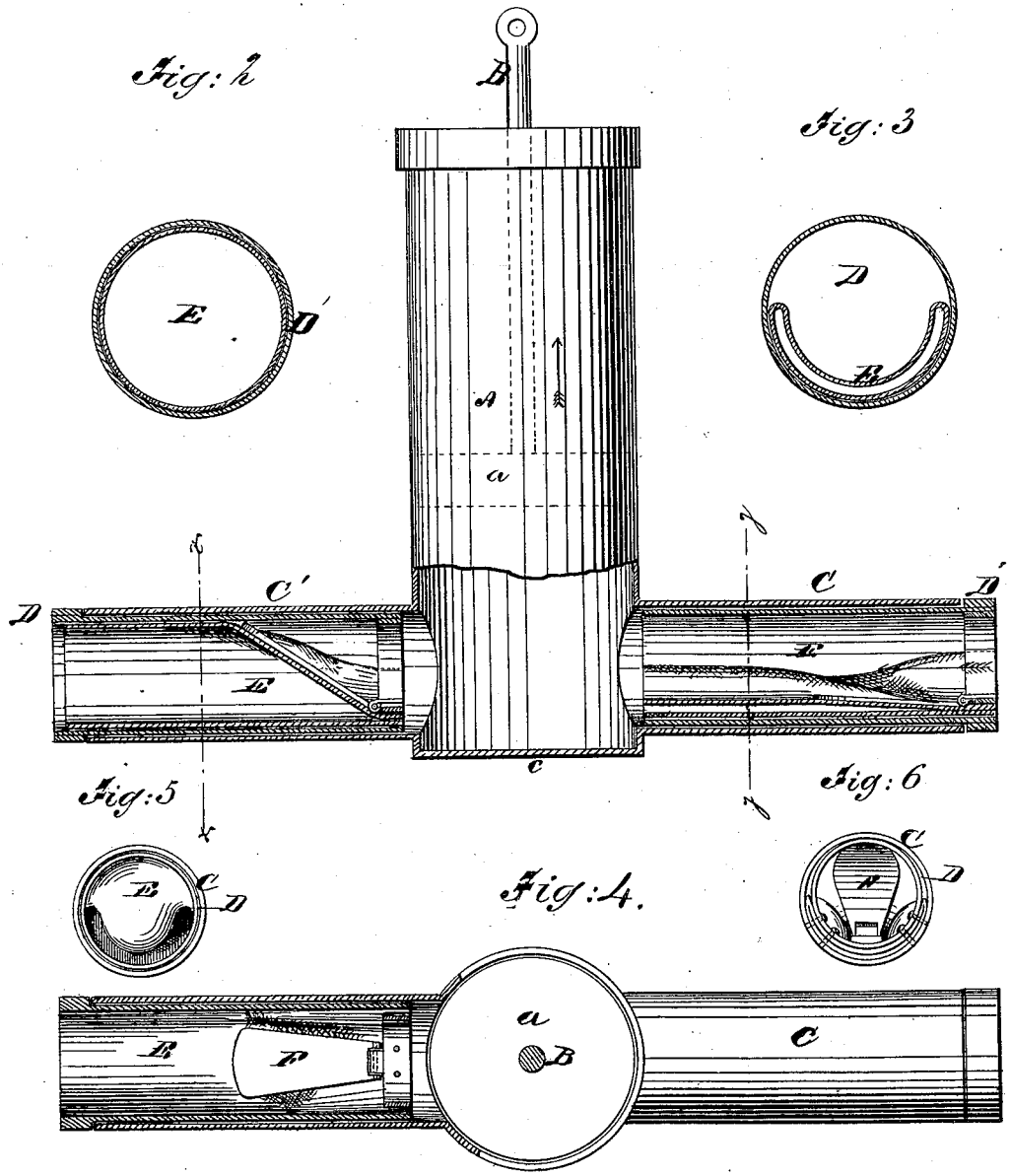

ALBERT W. JOHNSON AND HORACE A. NETTLETON, OF NEW HAVEN, CONNECTICUT; SAID NETTLETON ASSIGNOR TO SAID JOHNSON, AND SAID JOHNSON ASSIGNOR OF ONE-HALF HIS RIGHT TO JOHN MATTHEWMAN, OF SAME PLACE.

IMPROVEMENT IN PUMP AND CHECK VALVES.

Specification forming part of Letters Patent No. 164,563, dated June 15, 1875; application filed November 14, 1874.

*To all whom it may concern:*

Be it known that we, ALBERT W. JOHNSON and HORACE A. NETTLETON, of New Haven, in the county of New Haven and State of Connecticut, have invented a new and useful Improvement in Pumps; and that the following is a full, clear, and exact description of the same, reference being had to the accompanying drawings, and to the letters of reference marked thereon, making a part of this specification.

This invention is in the nature of an improvement in pump-valves; and the invention consists in a tubular valve, constructed in such manner as to collapse from the action of the piston of the pump, and permit the fluid and other substances to pass between the exterior surface of the valve, when it is collapsed, and the interior surface of the pipe containing the same, so that the full area of the outlet or inlet pipe into which the valve is fitted is preserved without obstruction of any kind, excepting the mere thickness of the collapsed rubber tube, which is immaterial; and the invention also consists in affixing within the pipe containing the aforementioned tubular valve a hinged guard-plate, constructed and arranged in such manner that it shall guard the end of the elastic valve from puncture by foreign substances, and prevent the elastic valve from being forced out of the cylinder containing the same, and at the same time readily yield, so as to permit the valve to collapse and allow the fluid, &c., to pass through the pipe containing the same.

This invention applies more particularly to pumps that are used for pumping out cesspools and such like places; and the peculiar construction of the valves permits the fluid and feculent matter, as well as foreign substances, to pass through the inlet and outlet pipes of the pump without offering obstruction to their passage, so that there will be little or no liability or danger of the pump or valve becoming clogged from the lodging within the pipes of unyielding substances.

In the accompanying sheet of drawings, Figure 1 is a side view of our invention, partly in section; Fig. 2, a cross-section of same, taken in line $x$ $x$, Fig. 1; Fig. 3, a cross-section of same, taken in line $y$ $y$, Fig. 1; Fig. 4, a plan or top view of same, partly in section; Fig. 5, an end view, showing valve closed; Fig. 6, a rear-end view, showing position of guard-plate; and Fig. 7, a transverse section of inner cylinder, showing valve.

Similar letters of reference indicate like parts in the several figures.

A represents the barrel of a pump, provided with the piston $a$ and piston or pump rod B, the lower part of this pump-barrel being closed, as at $c$, and it is provided with branch pipes C C'. This is the ordinary construction of pumps. Within the branch pipes C C', however, are fitted cylinders D D', and within each of these cylinders, extending the full length of the same, is fitted an elastic tubular valve, E. This valve is confined within the cylinder by rivets or otherwise, which pass through one of its ends, which is collapsed, securing the end of the elastic cylinder to one side of the cylinder D, as shown in Fig. 6, the collapsed end effectually closing the mouth of the cylinder to which it is secured. Fitted within each of the cylinders D, and at the end thereof to which the elastic cylinder is confined, is a hinged plate, F. This plate is hinged at its rear end, and projects into the cylinder D in an oblique direction. For the inlet-pipe C of the pump the cylinder D', with the valve and plate secured to the same, is placed within said inlet-pipe, so that the closed end of the elastic cylinder and the hinged guard-plate F will be outermost. For the outlet-pipe C', however, this position of the elastic cylinder is reversed, its closed end and the guard-plate F being innermost.

Our valve being constructed substantially as above described, its operation is as follows: The piston $a$ being drawn upward, a vacuum is formed, as in any ordinary pump, and the fluid or other matter into which the inlet-pipe C has been thrust is drawn into the cylinder D', the guard-plate F being pressed down as it enters, and, the elastic valve E collapsing, the substance being pumped passes without obstruction between the inner surface of the cylinder D' and the outer collapsed surface of the elastic valve E, the whole area of the cylinder D' being nearly unobstructed for that purpose, and none of the substances passing through the elastic valve, but between the outer surface of the same and the inner surface of the cylinder D', as before stated. The substances thus passing through the inlet-pipe C are at once forced, by the downward stroke of the piston, through the outlet-pipe C', the elastic cylindrical valve and guard-plate acting in precisely the manner just described.

The office of the guard-plate F is twofold: It protects the closed end of the cylinder from being punctured by sharp and unyielding substances that may be drawn in; and it also acts as a stop or check, preventing any tendency of the rubber valves to being forced out of the cylinders within which they are placed, in this way re-enforcing the fastening of the cylindrical valve to the inner cylinder.

We do not desire to claim, broadly, a valve formed from an elastic or yielding cylinder, since the use of the same is old and well known; but What we do claim as new, and desire to secure by Letters Patent, is—

1. In a pump, the tubular collapsible valves E, folded down and secured at one end within cylinders in the inlet and outlet tubes of such pump, and operating substantially as and for the purpose described.

2. In combination with tubular elastic valves arranged within a pump, the hinged metallic guard-plates F, unconnected with said valves, but operating in concert therewith, substantially as and for the purpose described.

ALBERT W. JOHNSON.
HORACE A. NETTLETON.

Witnesses:
H. L. WATTENBERG,
G. M. PLYMPTON.